United States Patent
Eyermann et al.

(10) Patent No.: US 8,615,674 B2
(45) Date of Patent: Dec. 24, 2013

(54) METHOD AND APPARATUS FOR THE REALIZATION OF A FAILSAFE TIME FUNCTION

(75) Inventors: Paul Eyermann, Herzogenaurach (DE); Michael LaBouliere, Doylestown, PA (US); Robert Schwarz, Princeton, NJ (US); Markus Walter, Bamberg (DE); Kai Weinert, Leisnig (DE)

(73) Assignee: Siemens Aktiegesellschaft, Munich (DE)

( * ) Notice: Subject to any disclaimer, the term of this patent is extended or adjusted under 35 U.S.C. 154(b) by 639 days.

(21) Appl. No.: 12/761,595

(22) Filed: Apr. 16, 2010
(Under 37 CFR 1.47)

(65) Prior Publication Data
US 2011/0185217 A1    Jul. 28, 2011

(30) Foreign Application Priority Data
Apr. 17, 2009    (EP) .................................... 09005483

(51) Int. Cl.
G06F 1/00    (2006.01)
G06F 1/04    (2006.01)
G06F 1/14    (2006.01)
G06F 11/00   (2006.01)

(52) U.S. Cl.
USPC .............................. 713/500; 713/502; 714/100

(58) Field of Classification Search
USPC ..................................... 713/500, 502; 714/100
See application file for complete search history.

(56) References Cited

U.S. PATENT DOCUMENTS

| | | | |
|---|---|---|---|
| 6,457,135 B1 | 9/2002 | Cooper | |
| 7,415,561 B2 * | 8/2008 | Jinzaki | ............ 710/267 |
| 2007/0245054 A1 | 10/2007 | Wang et al. | |
| 2008/0098146 A1 | 4/2008 | Lee | |

FOREIGN PATENT DOCUMENTS

WO    WO 2007/037640    4/2007

* cited by examiner

*Primary Examiner* — Mark Connolly
(74) *Attorney, Agent, or Firm* — Cozen O'Connor

(57) ABSTRACT

A method for enabling an oscillating crystal available in a system to be used to generate a software-realized time function, and an apparatus for implementing the method, without requiring additional hardware components, wherein a periodic interrupt signal is generated by the system-internal real-time clock, a table entry with a reference to a routine in an intra-system table is accessed upon receipt of the periodic interrupt signal and a counter is formed by the routine.

17 Claims, 4 Drawing Sheets

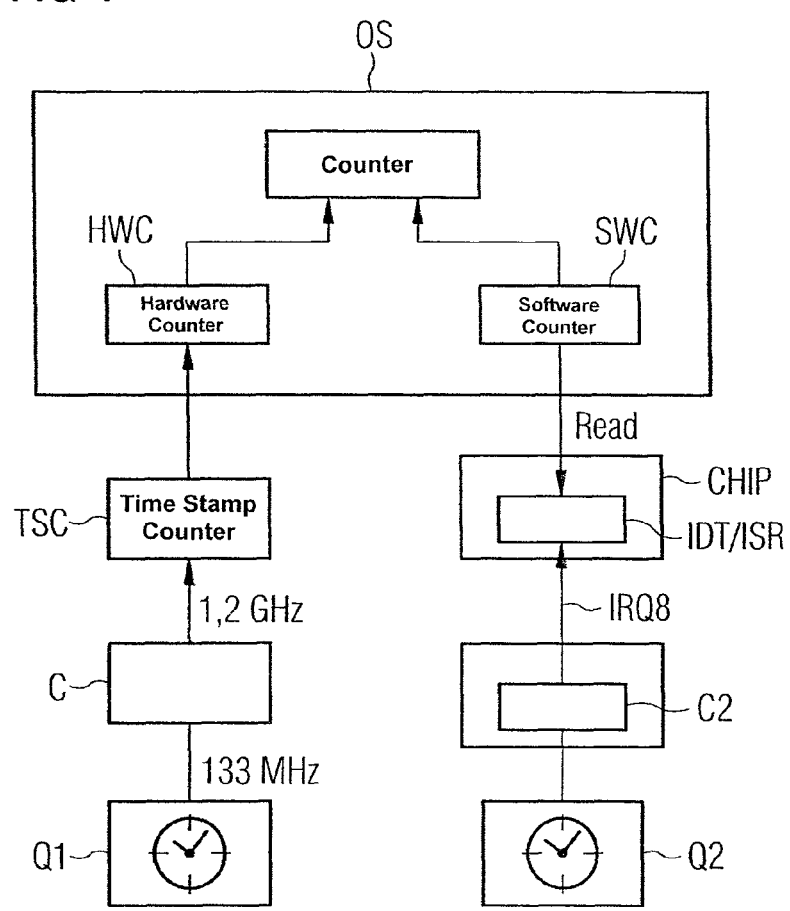

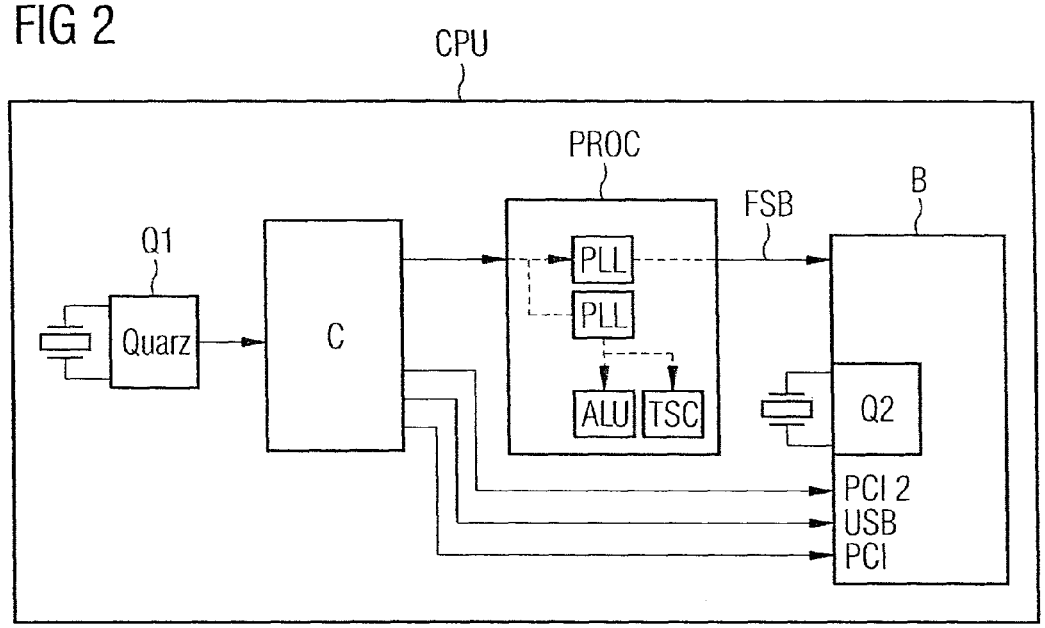
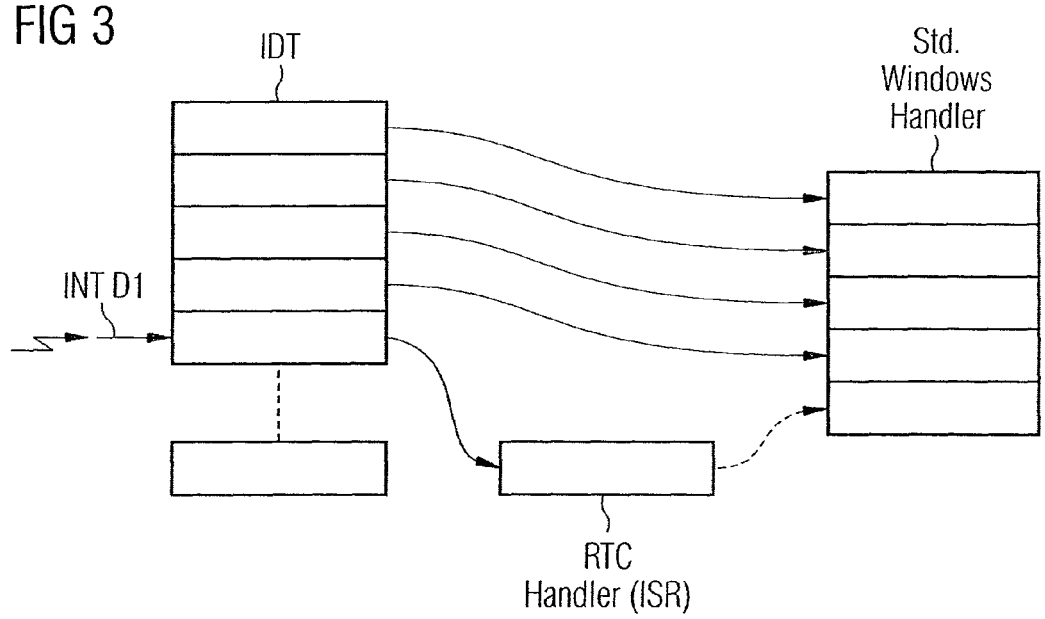

METHOD AND APPARATUS FOR THE REALIZATION OF A FAILSAFE TIME FUNCTION

BACKGROUND OF THE INVENTION

1. Field of the Invention

The present invention is directed to providing a failsafe time function in multiple systems in which different devices interact, where a standard time function that is available in the system is typically adjusted by a further independent timer, such as a monitoring timer or F-timer.

2. Description of the Related Art

The demands placed on the accuracy of the time signal are very high in the instances described, i.e., only a minimal fault and/or deviation tolerance is provided. The most well know counter is a timestamp counter (TSC), introduced with the x86 Pentium processors and since then featured in all CPU designs. This is a 64 bit register, the value of which is incremented with the CPU clock, and can also be read out from the kernel space and/or from the user space.

A second timer (i.e., an F-timer) hitherto had to be integrated to solve the problem of providing an accurate time signal. To this end, a corresponding hardware expansion, such as a special semiconductor module, is needed, which takes over the timing device.

It is also already known that an electrical oscillation can be generated to monitor a time base of a data processing unit by a single oscillating crystal and that a clock signal can be generated from the oscillation. As a result, a first task is cyclically called up with an interval from a first time duration and a counter value is changed to monitor the accuracy of a clock signal. In a second task, which is cyclically called up with an interval from a second time duration, an operation is applied to the counter value and a result of the operation is compared with a predeterminable limit value.

This timer monitoring function, however, does not provide an acceptable level of reliability, i.e., the function fails to meet the requirements set forth in the corresponding standards, e.g., International Electrotechnical Commission Standard (IEC) 61508.

SUMMARY OF THE INVENTION

It is therefore an object of the invention to provide a method which enables an oscillating crystal that is available in the system to be used for the explicit generation of a time function, and to provide an apparatus that does not have the above-described disadvantages and that operates without additional hardware (HW) components.

This and other objects and advantages are achieved by a method for generating a time signal in a processor, based on an intra-system real-time clock, comprising generating a periodic interrupt signal by the intra-system real-time clock, accessing a table entry in an intra-system table (IDT) with a reference to a routine upon receipt of the periodic interrupt signal, and forming a counter by the routine.

The object is also achieved by an apparatus for implementing a failsafe time function with a first intra-system real-time clock, a second intra-system real-time clock and an intra-system table (IDT), which contains a reference to a routine to be processed in the event of a periodic interrupt signal, with the interrupt signal having been generated by the intra-system real-time clock and in which the table entry can be accessed by a routine and a counter can be formed.

It is advantageous if the clock rate of the periodic interrupt signal is increased and the additional interrupt signals are filtered out. The previous processing routine thus advantageously obtains as many interrupt signals as before. The inventive method can thus be used on a standard operating system.

The first time signal is generated by a first system quartz and the second time signal is generated by a further system quartz crystal. The inventive time signal for monitoring a second time signal can thus be used for realizing a failsafe time function.

In a first embodiment, the frequency of the interrupt signal is substantially 8.192 kHz and the clock length is approximately 122.07 µs.

If periodic interrupts in the intra-system real-time clock (system quartz crystal), such as a CMOS/RTC, as a result of excessively long interrupt locks are not detected, faults may occur because in this case the monitoring timer runs more slowly and the two timers eventually drift apart from one another. In a further advantageous embodiment, the frequency of the interrupt signal is substantially 1.024 kHz and the clock length is approximately 976 µs. With a clock of 8.192 kHz, an interrupt lock of greater than 122 µs results in a loss of an interrupt and thus the monitoring time runs more slowly. With a clock of 1.024 kHz, an interrupt lock of greater than 976 µs nevertheless initially results in a loss of an interrupt.

With a standard timer, a clock length of 1 ms can be formed by standardization, and a clock length of approximately 122 µs is however also possible or also at higher resolutions.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described below with reference to exemplary embodiments, in which:

FIG. 1 is a schematic block diagram showing the process flow in accordance with an embodiment of the invention;

FIG. 2 shows an exemplary schematic block diagram of the hardware for implementing the method in accordance with an embodiment of the invention;

FIG. 3 shows the overwriting of the register in the intra-system table in accordance with an embodiment of the invention;

DETAILED DESCRIPTION OF THE PRESENTLY PREFERRED EMBODIMENTS

FIG. 1 shows a schematic block diagram of the process flow in accordance with the invention, where two time signals are illustrated that are generated by crystals Q1 and Q2 as shown in the hardware configuration of a central processor unit of FIG. 2. Returning to FIG. 1, the left crystal Q1 typically generates a frequency of 14.31818 MHz, where the signal is also forwarded to a phase-locked loop (PLL), such as an Intel Core with a 1.2 GHz clock rate. The time stamp counter (TSC) operates with the processor clock, where an overflow can typically be expected here after 487 years. This standard hardware counter (HWC) is then read out and standardized to 1 ms.

The real-time clock (RTC) crystal Q2 is visible in the right branch of FIG. 1, where the RTC crystal Q2 generates a clock of 32,768 kHz. The software counter (SWC) is counted up or down using an interrupt service routine (ISR), which is called up every 122.07 µs by the interrupt. This counter value can be read out over a programming interface and used for comparison purposes.

Some technical obstacles are to be overcome by the described solution. The RTC interrupt signal is redirected and processed by the interrupt service routine (ISR), so that the counter value is generated for the F-timer. To supply the operating system Windows with interrupt signals at the correct frequency, for instance, an interrupt filter is also implemented in the ISR, where the interrupt filter forwards each nth interrupt to the Windows operating system by transmitting an inter processor interrupt (IPI) message.

IRQ8 is used in the example of the Windows operating system. It is not permitted to couple the interrupt with corresponding application programming interface (API) requests. Direct access to the interrupt descriptor table (IDT) must therefore occur by bypassing the operating system (OS).

FIG. 3 shows how the F-timer RTC handler engages to overwrite the entry in the IDT. The specific technical realization is dependent on the HW platform used; e.g.: Platform check: single core or multi-core, and interrupt controller check: PIC/APIC.

The interrupt is redirected to the real-time express (RTX) processor (not shown), handled there and then forwarded to the Windows processor as, for example, an inter processor interrupt (IPI). The IPI is transmitted over an advanced programmable interrupt controller (APIC) bus (not shown) or over a Front Side Bus (FSB) (not shown) as a function of the implementing platform.

As the RTC periodic interrupt is already used by the operating system OS as a system timer, the change in frequency of the RTC IRQ8 would influence the perception of the time of the operating system. To prevent this, it is possible to filter out interrupts. With an increased frequency, only every nth interrupt is then forwarded, so that no negative effects in the operating system can be noticed.

Figure 4:
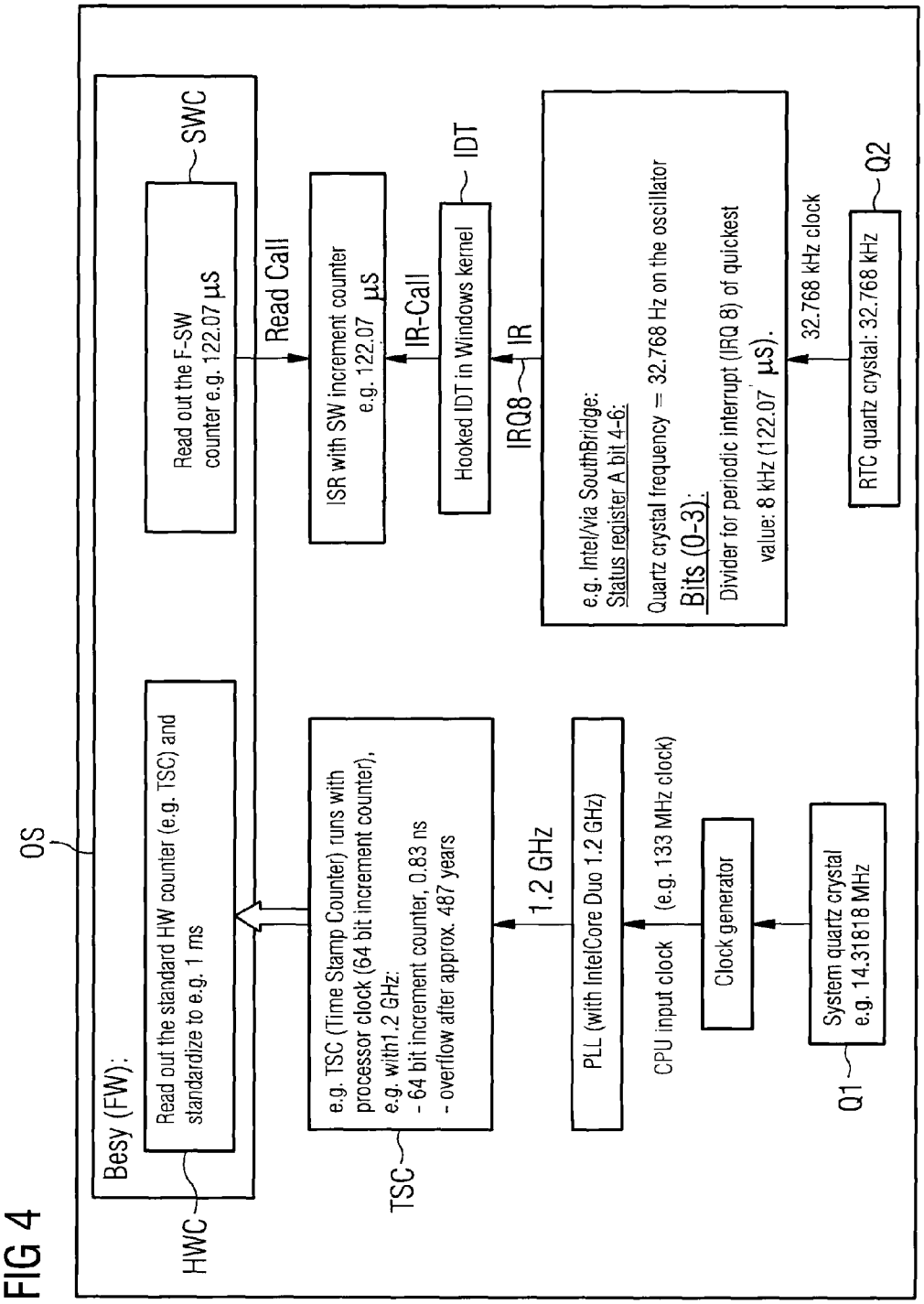
FIG. 4 shows an exemplary embodiment method in accordance with an embodiment of the invention.
Figure 5:
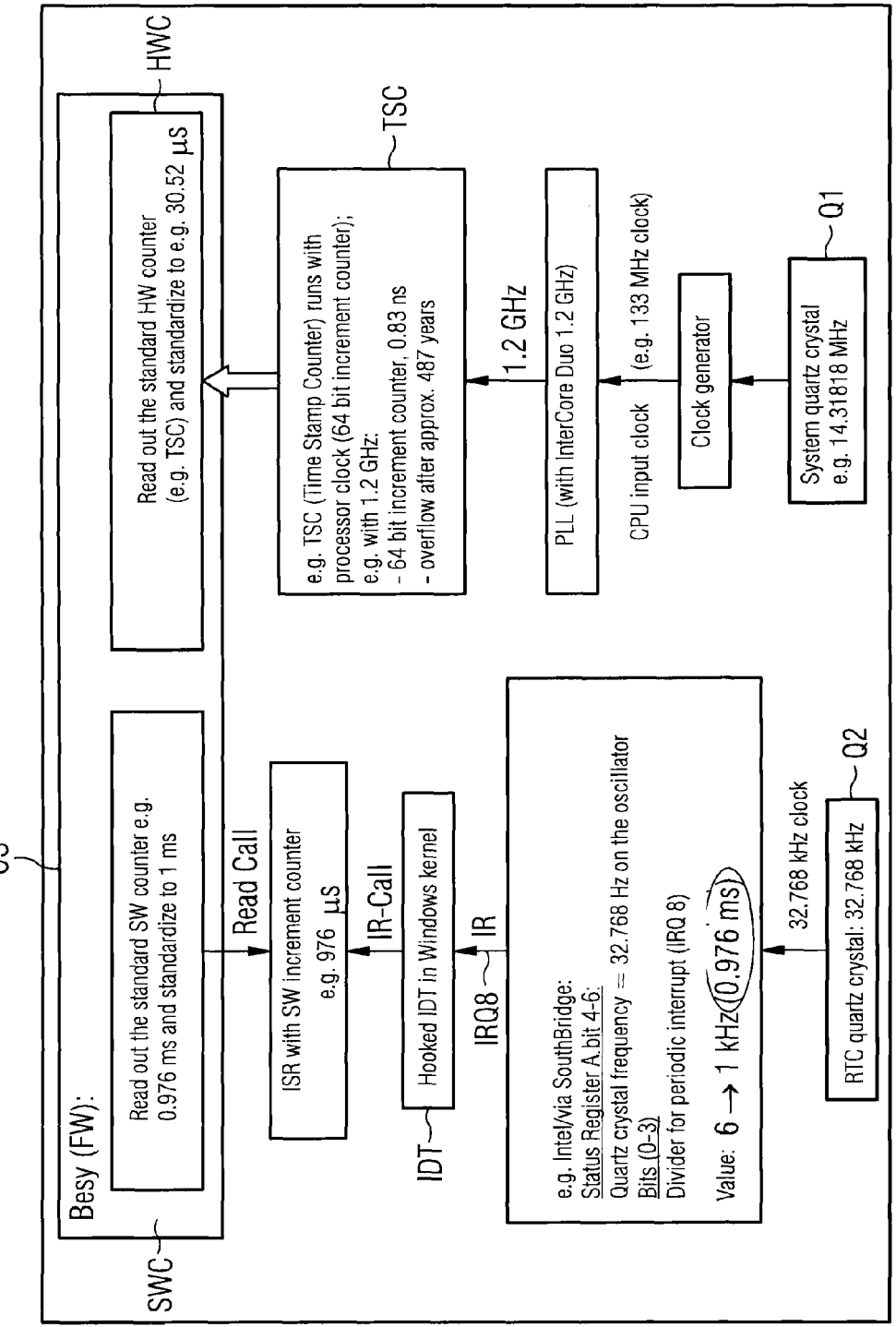
FIG. 5 another exemplary embodiment of the method in accordance with an alternative embodiment of the invention.

FIGS. 4 and 5 are schematic block diagrams that describe exemplary methods in accordance with an embodiment of the invention based on the general embodiment disclosed in FIG. 1. Apart from a standard timer, which is derived from the system quartz crystal Q1 (e.g., time stamp counter, local-APIC timer, PC-timer or PM-timer), the monitoring time signal F-Timer is formed from the CMOS/RTC (independent crystal Q2) without additional HW-expansion components.

To this end, the ability of the real-time clock (RTC) to generate a periodic interrupt (e.g., 122.070 µs) is used. The F-timer is formed from this periodic interrupt.

A periodic interrupt signal (e.g., with a clock length of 122.070 µs) is configured more accurately in the CMOS, with which the interrupt IRQ8 is generated, which is forwarded by, e.g., the external advanced programmable interrupt controller (APIC) in the SouthBridge to the CPU. The CPU then locates the interrupt service routine (ISR) for the RTC counter in the thus modified interrupt description table (IDT) and calls up the ISR. A counter is formed in the ISR after checking the configuration register in the CMOS/RTC.

Design and impact on the PC operating system, e.g., Windows with a subsidiary real-time operating system (e.g., Ardence RTX), by the hooked IDT of the F-timer: The RTC counter is implemented in the Windows kernel and in the RTX as an ISR. Normally, an interrupt service routine can be attached to the interrupt description table (IDT) with the RTX function RtAttachInterruptVector( ). However, in the instance of the RTC, this interrupt of the RTC was already reserved by Windows in a "non sharable" manner, i.e., the ISR can only be mounted in the IDT (Hooking IDT) by bypassing the functionality RtAttachInterruptVector( ) provided by Windows or Ardence by assembler routines. The exclusive reservation of the RTC interrupt is thus bypassed by Windows, thereby enabling access to essential system components of the user's PC. The type of "hooking" available here enables other applications to be called up like before, where the RTC-ISR is activated by the other ISRs and the ISR is then called up, which was already entered before the "hooking" in the IDT.

The method enables a failsafe time function for a security system with a security integrity level 3 (SIL3) (e.g., SIMATIC Distributed Safety) without providing any HW expansion and/or therefore also realizing this on a standard PC without any HW expansion (e.g., WinAC RTX F plus Distributed Safety).

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for generating a time signal in a processor based on an intra-system real-time clock, the method comprising:
   generating a periodic interrupt signal by the intra-system real-time clock;
   accessing a table entry in an intra-system table with reference to a routine upon receipt of the periodic interrupt signal;
   forming a counter based on the routine; and
   providing the counter over an interface;
   wherein a clock rate of the periodic interrupt signal is increased and additional interrupt signals are filtered out.

2. The method as claimed in claim 1, wherein a time signal for monitoring is used for a second time signal to obtain a failsafe time function.

3. The method as claimed in claim 2, wherein the time signal is generated by a system quartz crystal.

4. The method as claimed in claim 2, wherein the second time signal is generated by a further system quartz crystal.

5. The method as claimed in claim 1, wherein a time signal for monitoring is used for a second time signal to obtain a failsafe time function.

6. The method as claimed in claim 1, wherein the method is implemented in a standard operating system.

7. The method as claimed in claim 1, wherein a frequency of the periodic interrupt signal is substantially 8.192 kHz and a clock length of the periodic interrupt signal is approximately 122 µs.

8. The method as claimed in claim 7, wherein a clock signal having a length of 1 ms is formed by standardization.

9. The method as claimed in claim 1, wherein a frequency of the periodic interrupt signal is substantially 1.024 kHz and a clock length of the periodic interrupt signal is approximately 976 µs.

10. An apparatus for implementing a failsafe time function, comprising:
    a first intra-system real-time clock and standard time function formed therefrom;
    a second intra-system real-time clock; and
    an intra-system table containing a reference to a routine to be processed during a periodic interrupt signal;
    wherein the periodic interrupt signal is generated by the second intra-system real-time clock, a routine is called up by an entry in the intra-system table and a counter is formable by the routine and
    wherein a clock rate of the periodic interrupt signal is increased and additional interrupt signals are filtered out.

11. The apparatus as claimed in claim 10, wherein a frequency of the periodic interrupt signal is substantially 8.192 kHz and a clock length of the periodic interrupt signal is approximately 122 µs.

12. The apparatus as claimed in claim 11, wherein the intra-system real time clock is used in a CMOS device as a second intra-system real-time clock, the periodic interrupt signal is an IRQ8 signal, the intra-system table is an interrupt descriptor table, and wherein the interrupt service routine is accessed by the entry in the intra-system table.

13. The apparatus as claimed in claim 10, wherein a frequency of the interrupt signal is substantially 1.024 kHz and a clock length of the periodic interrupt signal is approximately 976 µs.

14. The apparatus as claimed in claim 13, wherein the intra-system real time clock is used in a CMOS device as a second intra-system real-time clock, the periodic interrupt signal is an IRQ8 signal, the intra-system table is an interrupt descriptor table, and wherein the interrupt service routine is accessed by the entry in the intra-system table.

15. The apparatus as claimed in claim 10, wherein the apparatus is usable within a standard operating system.

16. The apparatus as claimed in claim 15, wherein the intra-system real time clock is used in a CMOS device as a second intra-system real-time clock, the periodic interrupt signal is an IRQ8 signal, the intra-system table is an interrupt descriptor table, and wherein the interrupt service routine is accessed by the entry in the intra-system table.

17. The apparatus as claimed in claim 10, wherein the intra-system real time clock is used in a CMOS device as a second intra-system real-time clock, the periodic interrupt signal is an IRQ8 signal, the intra-system table is an interrupt descriptor table, and wherein the interrupt service routine is accessed by the entry in the intra-system table.

* * * * *